US012764261B2

(12) United States Patent
Katsumi

(10) Patent No.: US 12,764,261 B2
(45) Date of Patent: Oct. 13, 2026

(54) SIGNAL PROCESSING APPARATUS, CONTROL METHOD FOR SIGNAL PROCESSING APPARATUS, AND RECORDING MEDIUM

(71) Applicant: CANON KABUSHIKI KAISHA, Tokyo (JP)

(72) Inventor: Daisuke Katsumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/011,363

(22) Filed: Jan. 6, 2025

(65) Prior Publication Data

US 2025/0233969 A1 Jul. 17, 2025

(30) Foreign Application Priority Data

Jan. 15, 2024 (JP) ................................ 2024-004047

(51) Int. Cl.
*H04N 9/802* (2006.01)
*H04N 9/806* (2006.01)

(52) U.S. Cl.
CPC ........... *H04N 9/8063* (2013.01); *H04N 9/802* (2013.01)

(58) Field of Classification Search
CPC ............................ H04N 9/8063; H04N 9/802
USPC .......................................................... 386/241
See application file for complete search history.

(56) References Cited

U.S. PATENT DOCUMENTS 5,046,097 A * 9/1991 Lowe ...................... H04S 1/002 381/17
2022/0021997 A1* 1/2022 Morales .................. G06N 3/04
2025/0069615 A1* 2/2025 Hirayama ........... G10L 21/0208
2025/0380104 A1* 12/2025 Fukutani ........... H04N 21/4307

FOREIGN PATENT DOCUMENTS

JP 2012114779 A 6/2012
JP 2021040264 A 3/2021
WO WO-0205261 A2 * 1/2002 ............... H04S 3/00

* cited by examiner

*Primary Examiner* — Albert Kir
(74) *Attorney, Agent, or Firm* — Canon U.S.A., Inc., IP Division

(57) ABSTRACT

A signal processing apparatus includes one or more memories configured to store instructions, and one or more processors configured to execute the instructions to acquire first time information, perform signal processing on an acoustic signal to generate first acoustic data including the acquired first time information, measure processing time for the signal processing based on the acquired first time information and the first acoustic data, acquire second time information indicating a time after measuring the processing time, perform signal processing on the acoustic signal to generate second acoustic data that does not include the first time information and the acquired second time information, correct the second time information based on the processing time, and record the second acoustic data synchronized in time with the corrected second time information.

14 Claims, 8 Drawing Sheets

SIGNAL PROCESSING APPARATUS, CONTROL METHOD FOR SIGNAL PROCESSING APPARATUS, AND RECORDING MEDIUM

BACKGROUND

Field

The present disclosure relates to a signal processing apparatus, a control method for the signal processing apparatus, and a recording medium.

Description of the Related Art

A virtual viewpoint acoustic technique that generates an acoustic signal corresponding to a designated virtual viewpoint using acoustic data obtained by collecting sound through a plurality of microphones has been attracting attention. Japanese Patent Application Laid-open No. 2021-40264 discusses a technique of associating and recording acoustic data and a time code to generate a virtual viewpoint sound.

Further, regarding synchronizing acoustic data and a time code at a time of editing work by sharing the time code between a plurality of apparatuses, Japanese Patent Application Laid-open No. 2012-114779 discusses that, when playing back a main content in which a time code superimposed acoustic signal is recorded together with an image signal, a separately recorded acoustic content is synchronized with a time code, according to a time code obtained by demodulating the time code superimposed on the acoustic signal.

Japanese Patent Application Laid-open No. 2021-40264 does not discuss a method of correcting a shift between a time code and a delay of acoustic data generated when a collected acoustic signal is delayed by a lip synchronization (lip-sync) adjustment or the like. Further, the technique discussed in Japanese Patent Application Laid-open No. 2012-114779 needs to prepare an acoustic track for the time code on a sound collection apparatus.

SUMMARY

The present disclosure is directed to a technique for enabling a signal processing apparatus to synchronize time information and an acoustic signal regardless of whether the acoustic signal includes a time code.

According to an aspect of the present disclosure, a signal processing apparatus is provided that includes one or more memories configured to store instructions, and one or more processors configured to execute the instructions to acquire first time information, perform signal processing on an acoustic signal to generate first acoustic data including the acquired first time information, measure processing time for the signal processing based on the acquired first time information and the first acoustic data, acquire second time information indicating a time after measuring the processing time, perform signal processing on the acoustic signal to generate second acoustic data that does not include the first time information and the acquired second time information, correct the second time information based on the processing time, and record the second acoustic data synchronized in time with the corrected second time information.

Further features of the present disclosure will become apparent from the following description of exemplary embodiments with reference to the attached drawings.

DESCRIPTION OF THE EMBODIMENTS

Exemplary embodiments of the present disclosure are described herein with reference to the attached drawings. The exemplary embodiments are not intended to limit the present disclosure, the scope of which is set forth in the appended claims. In the exemplary embodiments, a plurality of features are described, regarding which non-essential features may be combined. In addition, the same or similar components are assigned the same symbols, and redundant descriptions thereof may be omitted.

A baseball game with a sound pickup target is described as an example for exemplary embodiments. For example, game sounds are collected as sound collection targets, which may include collecting a game sound that is generated at a ground level, e.g., a hitting sound and/or a catching sound; collecting a cheering sound that is generated in the stands that are elevated from the ground level; and, for television (TV) broadcasting, collecting voices for a live baseball broadcast and/or comments, with the collected acoustic signals being recorded in synchronization with a time code. However, the present disclosure is not limited to the baseball game, and may be, for example, other games, music concerts, and similar activities.

In a first exemplary embodiment, in a TV broadcast of a baseball game, an example of synchronizing and recording acoustic data based on an acoustic signal acquired from a general baseball broadcasting system, and time information based on a time code will be described.

Figure 1:
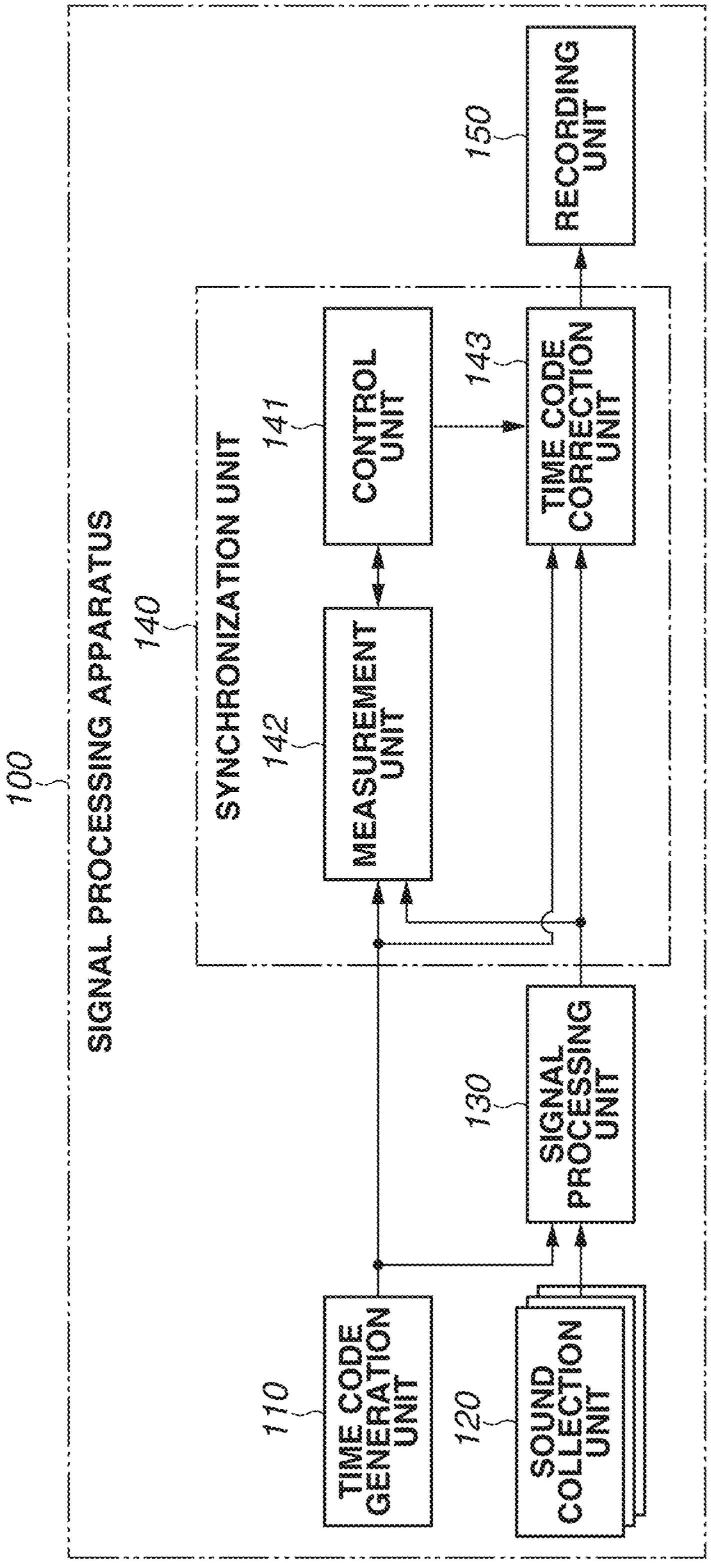
FIG. 1 is a block diagram illustrating a functional configuration of a signal processing apparatus according to a first exemplary embodiment.

FIG. 1 is a block diagram illustrating a functional configuration of a signal processing apparatus 100 according to the first exemplary embodiment. The signal processing apparatus 100 includes a time code generation unit 110, a sound collection unit 120, a signal processing unit 130, a synchronization unit 140, and a recording unit 150. The synchronization unit 140 includes a control unit 141, a measurement unit 142, and a time code correction unit 143.

In the present exemplary embodiment, the signal processing apparatus 100 has a measuring mode and a recording mode as operation modes. In the measuring mode, the signal processing apparatus 100 measures a delay amount (i.e., delay time) caused by the signal processing performed by the signal processing unit 130, and calculates a time code correction value based on the measured delay amount. In the recording mode, the signal processing apparatus 100 corrects the time code based on the time code correction value calculated in the measuring mode. Then, the signal processing apparatus 100 synchronizes acoustic data based on the acoustic signal with time information based on the corrected time code. The signal processing apparatus 100 records time information and the acoustic data. In the baseball game, for example, the signal processing apparatus 100 operates in the measuring mode before the baseball game starts to obtain acoustical characteristics of the baseball stadium, and operates in the recording mode during the baseball game. In this way, the signal processing apparatus 100 can synchronize and record the time information and the acoustic data.

The time code generation unit 110 generates a time code indicating a point in time position, and outputs the generated time code to the signal processing unit 130, the measurement unit 142, and the time code correction unit 143.

The time code generation unit 110 is, for example, a master clock or a device synchronizing with the master clock. In this case, the time code may be, for example, a Linear Timecode or Longitudinal Timecode (LTC) standardized by Society of Motion Picture and Television Engineers (SMPTE). The time code generation unit 110 may be, for example, a time measurement unit. The time code generated by the time code generation unit 110 is an example of first time information.

The sound collection unit 120 collects sound generated by a sound collection target, and outputs the collected sound as an acoustic signal configured of one or more channels to the signal processing unit 130. The sound collection unit 120 may be configured of, for example, a plurality of microphones and may be configured of different types of microphones. In the present exemplary embodiment, the acoustic signal output from the sound collection unit 120 is not provided with an acoustic track for a time code, and thus does not include the time code.

The signal processing unit 130 receives the time code from the time code generation unit 110 and/or the acoustic signal from the sound collection unit 120, and performs signal processing thereon. In the present exemplary embodiment, the time code from the time code generation unit 110 is input to the signal processing unit 130 in the measuring mode, and the acoustic signal is input to the signal processing unit 130 from the sound collection unit 120 in the recording mode. The signal processing unit 130 outputs the input time code or the signal-processed acoustic signal to the measurement unit 142 and the time code correction unit 143. In the present exemplary embodiment, the signal processing unit 130 outputs the input time code with its value unchanged. In the descriptions below, the time code output from the signal processing unit 130 may be referred to as a measuring target time code. The time code (measuring target time code) output from the signal processing unit 130 is an example of second time information.

Figure 2:
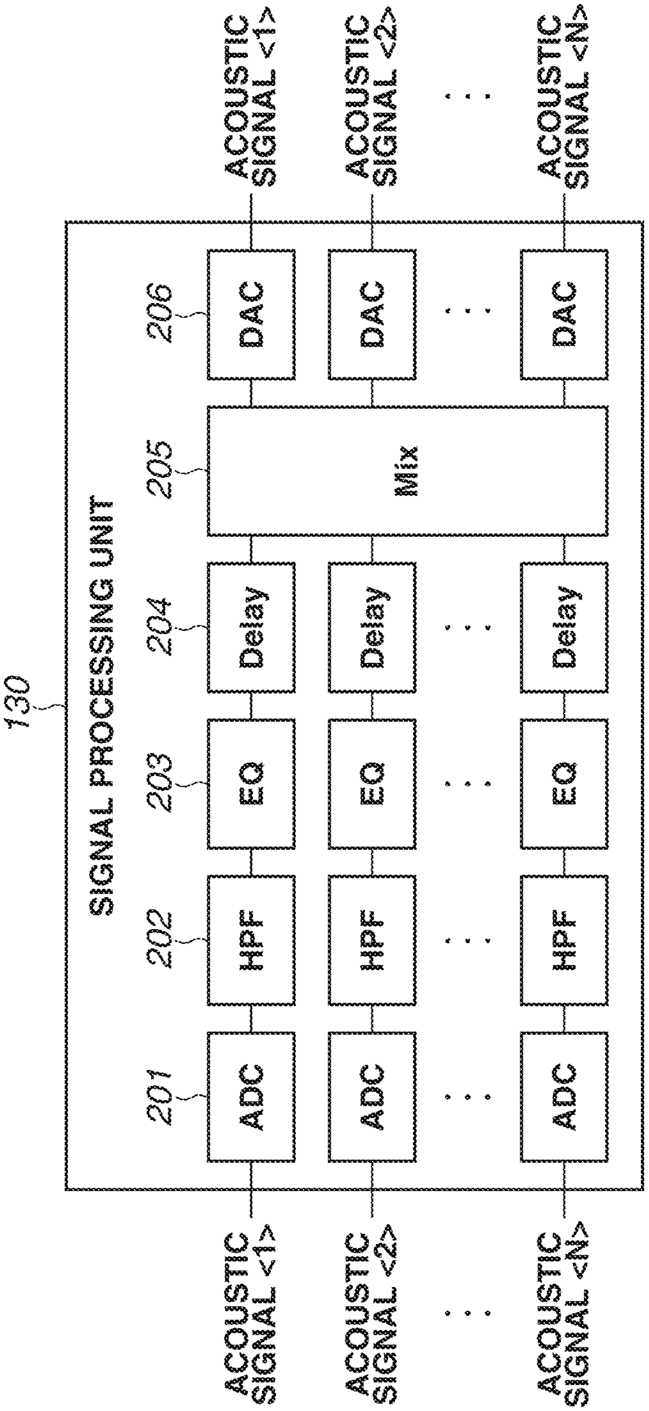
FIG. 2 is a block diagram illustrating a configuration of a signal processing unit.

In the present exemplary embodiment, the signal processing unit 130 is, for example, an audio mixer or a frame synchronizer. The signal processing unit 130 may be a device group obtained by combining a plurality of audio mixers and/or frame synchronizers. The signal processing unit 130 performs various kinds of signal processing on the input signal, as illustrated in the example provided in FIG. 2. The processing performed by the signal processing unit 130 includes, for example, analog-to-digital conversion processing (ADC) 201, high-pass filter processing (HPF) 202, and equalizing processing (EQ) 203. Further, for example, the processing performed by the signal processing unit 130 includes delay processing (Delay) 204, mixing processing (Mix) 205, and digital-to-analog conversion processing (DAC) 206. For example, the signal processing unit 130 applies delay processing on an acoustic signal in a case where a lip synchronization (also referred to as lip-sync) is performed between a video image and a sound and/or voice in applications of TV broadcasting or the like. In addition, the signal processing unit 130 illustrated in FIG. 2 is just an example, and other processing may be included, and a part of the processing illustrated in FIG. 2 may be omitted.

In the present exemplary embodiment, in a case where the signal processing unit 130 performs the above-described signal processing on the acoustic signal, the time at which the acoustic signal is output is delayed until after output of the time code from the time code generation unit 110. For example, in a case where the signal processing unit 130 applies the delay processing on the acoustic signal, the acoustic signal output from the signal processing unit 130 delays by the delay processing amount relative to the time code output from the time code generation unit 110.

The synchronization unit 140 corrects the shift between the time code from the time code generation unit 110 and the acoustic signal from the signal processing unit 130 to synchronize the time code and the acoustic signal. In other words, the synchronization unit 140 performs processing so as to be able to record the acoustic signal together with the time code on which the processing time of the signal processing unit 130 is reflected, with the processing time corresponding to the delay amount/delay time. As described above, the synchronization unit 140 includes the control unit 141, the measurement unit 142, and the time code correction unit 143.

The control unit 141 outputs control information based on an input by a user's operation or the like, to control the operation of the signal processing apparatus 100. For example, the control unit 141 controls whether to perform processing (operation in measuring mode) of measuring a delay amount caused by the signal processing performed by the signal processing unit 130, or to perform processing (operation in recording mode) of synchronizing the acoustic signal and the time information based on the time code. For example, the control unit 141 measures the delay amount caused by the signal processing performed by the signal processing unit 130, and outputs to the measurement unit 142 a delay measuring request for causing the measurement unit 142 to calculate a time code correction value. Further, the control unit 141 sets the time code correction value acquired from the measurement unit 142 to the time code correction unit 143.

The measurement unit 142 measures the delay amount caused by the signal processing performed by the signal processing unit 130, and calculates the time code correction value, based on the delay measuring request from the control unit 141. The measurement unit 142 compares the time code acquired from the time code generation unit 110 and the time code (measuring target time code) acquired from the signal processing unit 130 to measure the delay amount caused by the signal processing unit 130. Further, the measurement unit 142 calculates the time code correction value for synchronizing and recording the acoustic signal and the time code from the measurement result, and outputs the calculated time code correction value to the control unit 141.

The time code correction unit 143 synchronizes the time code and the acoustic signal, based on the time code acquired from the time code generation unit 110, the acoustic signal acquired from the signal processing unit 130, and the time code correction value acquired from the control unit 141. The time code correction unit 143 clips the acoustic signal according to the time code. Then, the time code correction unit 143 outputs to the recording unit 150 the synchronized time code as time information, and the clipped acoustic signals as acoustic data. This synchronized time code is an example of third time information. For example, the time code correction unit 143 clips the acoustic signal in a predetermined unit (e.g., predetermined frame unit or predetermined data sample unit) corresponding to the time information. Accordingly, in a case where the acoustic signal is clipped in a predetermined unit, the time information unit is integral multiple of the predetermined unit. The predetermined unit is, for example, a time width of the frame unit or the data sample unit. The recording unit 150 records the time information and the acoustic data input from the time code correction unit 143.

In addition, in the example illustrated in FIG. 1, the signal processing apparatus 100 is configured to include the time code generation unit 110, but the configuration is not limited thereto. For example, the signal processing apparatus 100 may be connected to an external time code generation apparatus via a cable or the like, to acquire the time code from the time code generation apparatus.

Further, in the example illustrated in FIG. 1, the signal processing apparatus 100 is configured to include the sound collection unit 120, but the configuration is not limited thereto. For example, the signal processing apparatus 100 may be connected to an external sound collection device such as a microphone via a cable or the like, to acquire the acoustic signal from the sound collection device.

Figure 3:
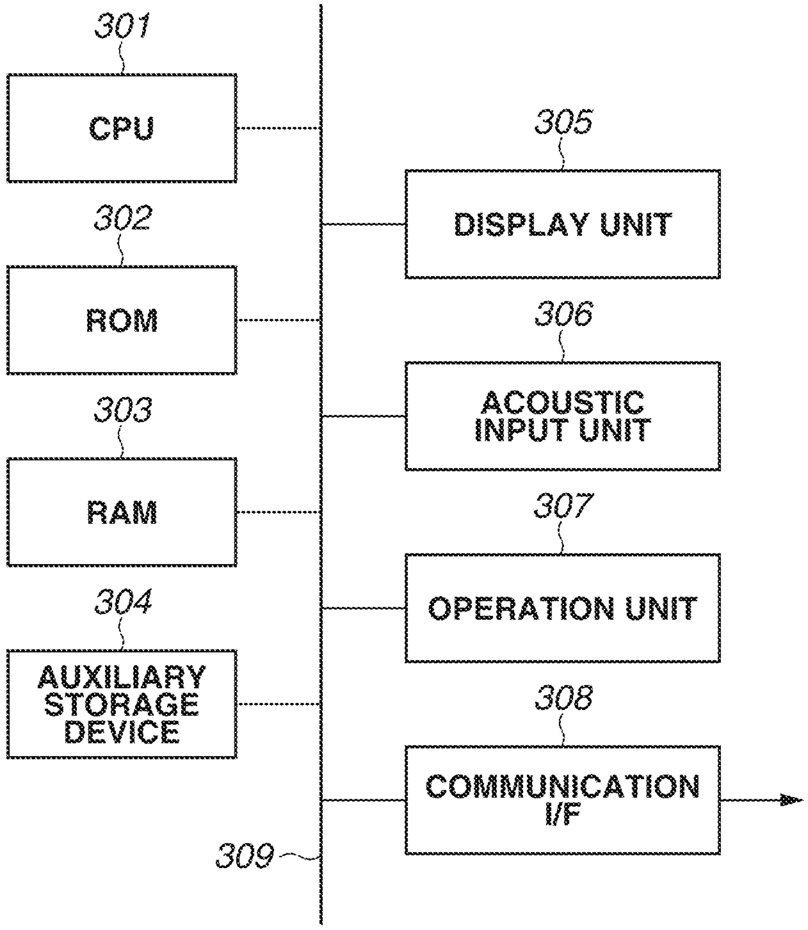
FIG. 3 is a block diagram illustrating a hardware configuration of the signal processing apparatus.

FIG. 3 is a block diagram illustrating a hardware configuration of the signal processing apparatus 100 according to the present exemplary embodiment. The signal processing apparatus 100 according to the present exemplary embodiment includes a central processing unit (CPU) 301, a read only member (ROM) 302, a random access memory (RAM) 303, an auxiliary storage device 304, a display unit 305, an acoustic input unit 306, an operation unit 307, a communication interface (I/F) 308, and a bus 309. The CPU 301, the ROM 302, the RAM 303, the auxiliary storage device 304, the display unit 305, the acoustic input unit 306, the operation unit 307, and the communication I/F 308 are communicably connected with each other via the bus 309. In addition, the signal processing apparatus 100 may further include other configurations.

The CPU 301 controls the signal processing apparatus 100 by using programs (e.g., non-transitory computer readable media) and data stored in the ROM 302 or the RAM 303, to implement functions of the signal processing apparatus 100 illustrated in FIG. 1. For example, the CPU 301 reads and executes a program stored in the ROM 302 or the like, to execute processing according to each flowchart described below. In addition, the signal processing apparatus 100 may include one or more dedicated hardware configurations different from the CPU 301, and at least a part of the processing performed by the CPU 301 may be performed by the dedicated hardware configuration or the configurations. Examples of the dedicated hardware configurations include application specific integrated circuits (ASIC) or the like.

The ROM 302 stores various programs, various pieces of data, and related information. For example, the ROM 302 stores a program for the CPU 301 to control the signal processing apparatus 100. The RAM 303 temporarily stores a program and data supplied from the auxiliary storage device 304 or the like, and data and related information supplied from an external apparatus via the communication I/F 308. For example, the auxiliary storage device 304 is configured of a hard disk drive (HDD), a solid state drive (SSD), or the like, and stores various pieces of data, such as an acoustic signal and/or setting information.

For example, the display unit 305 is configured of a liquid crystal display or light emitting diodes (LEDs), and displays a graphical user interface (GUI) for a user to operate the system. For example, the acoustic input unit 306 is configured of a microphone and an analog-to-digital (A/D) converter, and inputs the collected acoustic signal. For example, the operation unit 307 is configured as a keyboard, a mouse, a joy stick, and a touch panel to receive user's operations to input various instructions to the CPU 301. The CPU 301 functions as a display control unit for controlling the display unit 305, and an operation control unit for controlling the operation unit 307.

The communication I/F 308 is used for communications with an external apparatus. For example, in a case where the signal processing apparatus 100 is connected with an external apparatus in a wired manner, a communication cable is connected to the communication I/F 308. Further, for example, in a case where the signal processing apparatus 100 has a function of wirelessly communicating with an external apparatus, the communication I/F 308 is provided with an antenna. The bus 309 connects the units in the signal processing apparatus 100 to transmit information therebetween.

Figure 4:
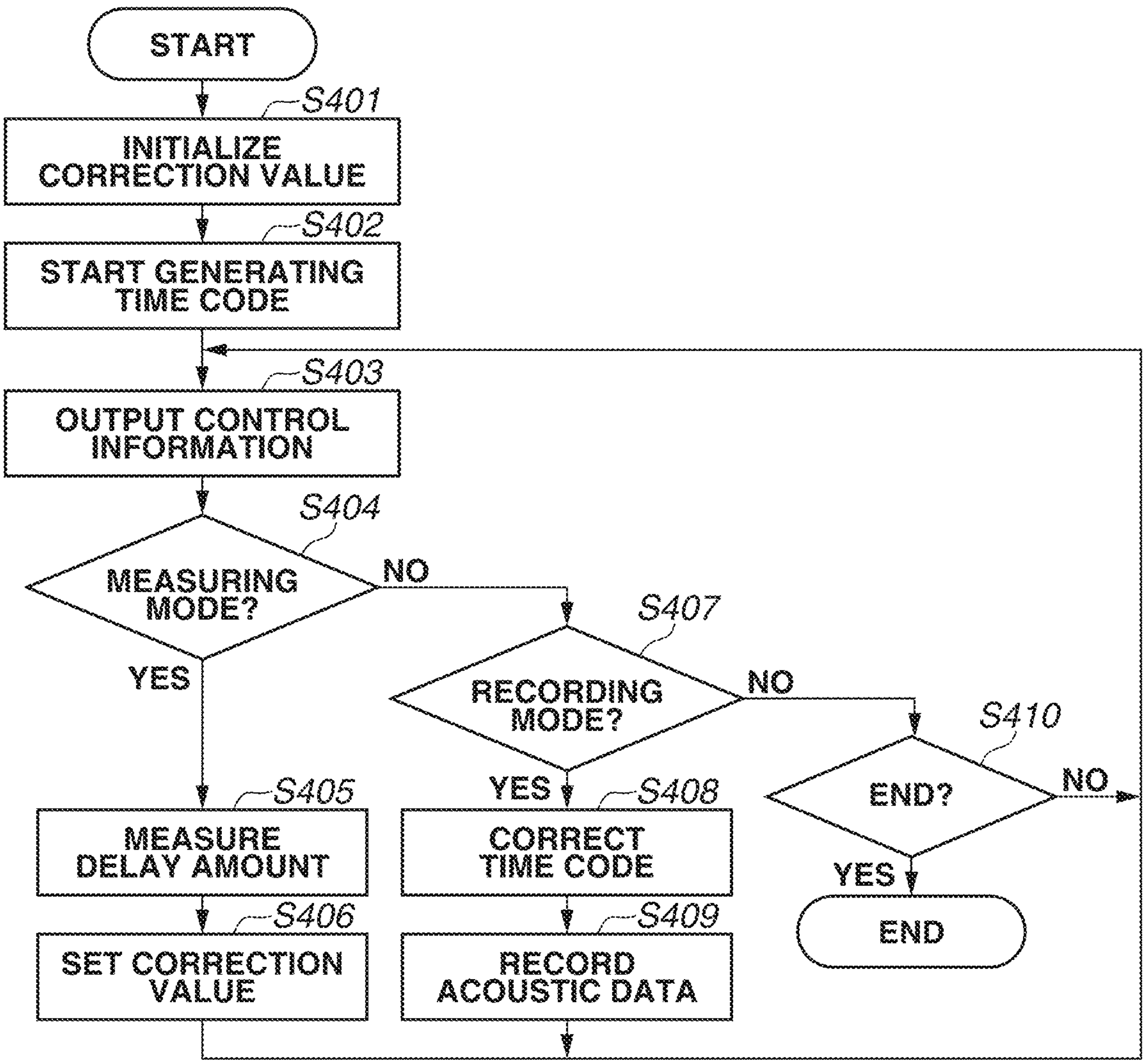
FIG. 4 is a flowchart illustrating an example of processing performed by the signal processing apparatus according to the first exemplary embodiment.

FIG. 4 is a flowchart illustrating an example of processing performed by the signal processing apparatus 100 according to the first exemplary embodiment. The processing illustrated in FIG. 4 starts at a time, for example, at which the signal processing apparatus 100 receives an instruction to begin processing the previously recorded acoustic data. The instruction to start the processing may be performed by a user's operation via the operation unit 307 or the like of the signal processing apparatus 100, or may be input from another device. In addition, the timing at which the processing illustrated in FIG. 4 starts is not limited to the above-described timing. The processing illustrated in FIG. 4 is performed by the CPU 301 loading a program stored in the ROM 302 or the like into the RAM 303 and executing the loaded program. In addition, at least a part of the processing illustrated in FIG. 4 may be performed by one or more dedicated hardware configurations different from the CPU 301.

In step S401, the time code correction unit 143 initializes a time code correction value. The time code correction value is a value indicating a time, and may be, for example, a frame unit. Further, the initial value of the time code correction value may be 0 (zero), or a predetermined value.

In step S402, the time code generation unit 110 generates and outputs a time code to the signal processing unit 130, the measurement unit 142, and the time code correction unit 143.

In step S403, the control unit 141 receives a user's operation or the like via the operation unit 307, and outputs control information to the measurement unit 142 and the time code correction unit 143. The control information may be information related to an operation control of the signal processing apparatus 100, and be information indicating an operation mode of the measuring mode or the recording mode, and an end of the operation. In the measuring mode, the signal processing apparatus 100 performs operations of measuring a delay amount caused by the signal processing performed by the signal processing unit 130, acquiring a time code correction value, and setting the acquired time code correction value. In the recording mode, the signal processing apparatus 100 performs operations of correcting the time code based on the set time code correction value.

Then, the signal processing apparatus 100 performs operations of synchronizing acoustic data based on the acoustic signal with time information based on the corrected time code. The signal processing apparatus 100 performs operations of recording the time information and the acoustic data.

In step S404, the measurement unit 142 receives the control information from the control unit 141, and determines whether the control information is information indicating entry into the measuring mode. In a case where the measurement unit 142 determines that the control information is information indicating entry into the measuring mode (YES in step S404), the processing proceeds to step S405. On the other hand, in a case where the measurement unit 142 determines that the control information is not information indicating entry into the measuring mode (NO in step S404), the processing proceeds to step S407.

In step S405, the measurement unit 142 measures the delay amount caused by the signal processing performed by the signal processing unit 130, and calculates the time code correction value. The measurement unit 142 receives a time code from the time code generation unit 110 and receives another time code (measuring target time code) from the signal processing unit 130, and determines a value obtained by subtracting the time code from the another time code (measuring target time code) as the time code correction value. The time code correction value may be a frame unit. For example, in a case where the time code is "13:00:15;20", and the measuring target time code is "13:00:15;15", the time code correction value is "−5" frames. The measurement unit 142 outputs as the time code correction value the value calculated in this way to the control unit 141.

In addition, there is a possibility that a reduction in the signal level of the measuring target time code relative to the time code caused by the signal processing performed by the signal processing unit 130 may occur, and a problem may occur in analyzing the measuring target time code by the measurement unit 142. Thus, a level correction unit for correcting the signal level of the measuring target time code may be provided between the measurement unit 142 and the signal processing unit 130.

In step S406, the control unit 141 receives an input of the time code correction value by the measurement unit 142, and sets the time code correction value to the time code correction unit 143. After performing the processing in step S406, the processing returns to step S403.

In step S407, the measurement unit 142 receives the control information from the control unit 141, and determines whether the control information is information indicating the recording mode. In a case where the measurement unit 142 determines that the control information is the information indicating the recording mode (YES in step S407), the processing proceeds to step S408. On the other hand, in a case where the measurement unit 142 determines that the control information is not the information indicating the recording mode (NO in step S407), the processing proceeds to step S410.

In step S408, the time code correction unit 143 receives the time code from the time code generation unit 110 and the acoustic signal from the signal processing unit 130, and corrects the time code based on the time code correction value set in step S406. Further, the time code correction unit 143 clips the acoustic signal by setting the corrected time code as time information and based on the time information, and outputs as the acoustic data the clipped acoustic signal together with the time information to the recording unit 150. For example, the time code correction unit 143 includes the time information in a predetermined channel of the acoustic signal configured of a plurality of channels, and outputs the time information and the acoustic data.

Figure 5A:
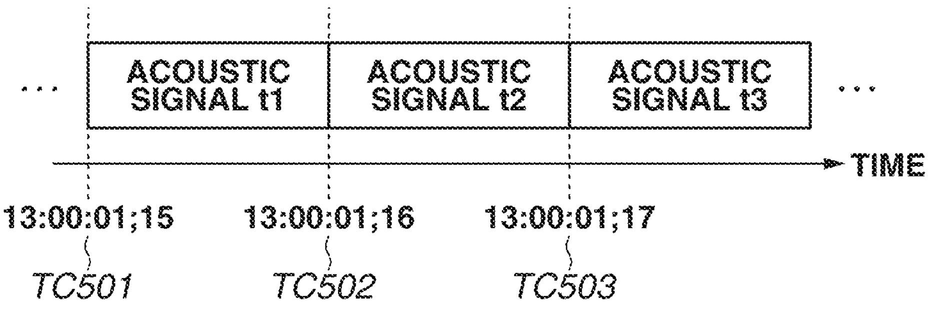
FIGS. 5A to 5C are diagrams illustrating synchronization between a time code and acoustic data.
Figure 5B:
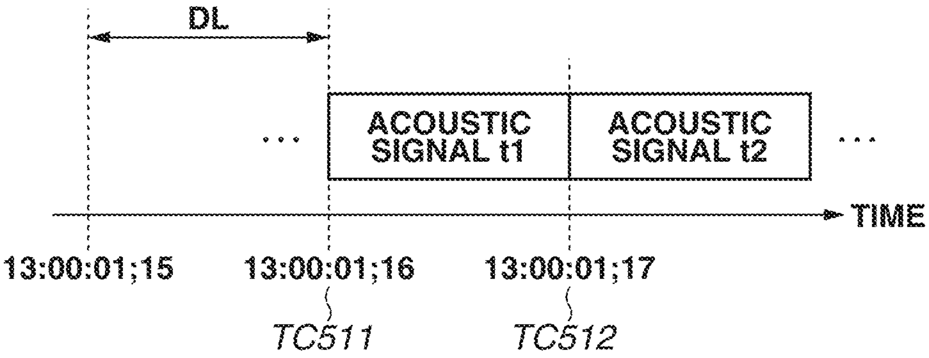
Figure 5C:
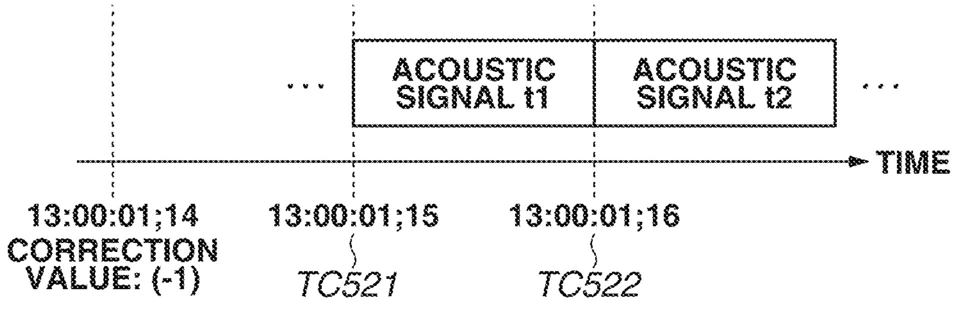

With reference to FIGS. 5A to 5C, a method of correcting the time code using the time code correction value will be described. Assume that the acoustic signal is clipped based on the time code, as illustrated in FIG. 5A, the time code that should be added to an acoustic signal t1 is a time code TC501 of "13:00:01;15". Similarly, the time code that should be added to an acoustic signal t2 is a time code TC502 of "13:00:01;16", and the time code that should be added to an acoustic signal t3 is a time code TC503 of "13:00:01;17".

As described above, assume that the acoustic signal delays by the signal processing (e.g., delay processing) performed by the signal processing unit 130. For example, in a case where a delay amount (DL) corresponds to one frame of the time code, as illustrated in FIG. 5B, a time code TC511 of "13:00:01;16" that is one frame ahead is associated with the acoustic signal t1. Similarly, a time code TC512 of "13:00:01;17" that is one frame ahead is associated with the acoustic signal t2.

A value to correct the shift is the time code correction value, and as illustrated in FIG. 5C, correcting the time code by a previous (−1) frame based on the time code correction value enables the time code and the acoustic data to be synchronized and recorded. For example, in the example illustrated in FIG. 5C, a time code TC521 of "13:00:01;15" obtained by correcting the time code of "13:00:01;16" from the time code generation unit 110 by a previous (−1) frame is given to the acoustic signal t1. Similarly, a time code TC522 of "13:00:01;16" obtained by correcting the time code of "13:00:01;17" from the time code generation unit 110 by the previous (−1) frame is given to the acoustic signal t2. In this way, the time code is corrected by adding the time code correction value to the time code from the time code generation unit 110, and given to the acoustic signal.

In addition, the time code correction value need not necessarily be the time code in a single frame unit, and the time code correction value may be, for example, time information in 1 ms unit. In this case, for the shift less than one frame, the time code and the acoustic data can be more accurately synchronized by correcting the acoustic signal in a time direction.

In step S409, the recording unit 150 receives the time information and the acoustic data input from the time code correction unit 143, and records the time information and the acoustic data. After performing the processing in step S409, the processing returns to step S403.

In step S410, the measurement unit 142 receives control information from the control unit 141 and determines whether the control information is an end instruction. In a case where the measurement unit 142 determines that the control information is the end instruction (YES in step S410), the processing illustrated in FIG. 4 ends. On the other hand, in a case where the measurement unit 142 determines that the control information is not the end instruction (NO in step S410), the processing returns to step S403.

In addition, in the recording mode, since the time code does not need to be input to the signal processing unit 130, the time code may be prevented from being mixed with the acoustic signal to be recorded. More specifically, a switch interlocking with the control information output from the control unit 141 may be provided between the time code generation unit 110 and the signal processing unit 130, to interrupt the input of the time code from the time code generation unit 110 to the signal processing unit 130 in the recording mode. Alternatively, the signal processing unit

130 may be interlocked with the control unit 141, and in the recording mode, the input of the time code may be muted.

According to the present exemplary embodiment, the measurement unit 142 measures the delay amount caused by the signal processing performed by the signal processing unit 130 based on the time code and the measuring target time code, and calculates the time code correction value. Then, the time code correction unit 143 corrects the time code based on the time code correction value calculated by the measurement unit 142, and synchronizes the time information based on the corrected time code and the acoustic signal. In this way, it is possible to correct the shift between the time code and the delay of the acoustic signal caused by the signal processing, and synchronize the time information and the acoustic signal, even if the acoustic signal does not include the time code. For example, it is possible to synchronize and record the time information and the acoustic data without recording the time code on the acoustic track.

In a second exemplary embodiment, a method of synchronizing and recording the time information and the acoustic data of a plurality of acoustic signals different in delay amount will be described. For example, for TV broadcast of a baseball game, the method can be applied to a case where Company A is in charge of a conventional stereo broadcasting sound, and Company B is in charge of a stereophonic sound. In this case, sound collection devices and signal processing apparatuses used by Company A and those used by Company B may be configured of different devices, and may be simultaneously used. In such a case, there may be a difference in delay amount caused by the signal processing or the like between the acoustic signal by Company A and the acoustic signal by Company B, but according to the present exemplary embodiment, the time information and the acoustic data can be synchronized and recorded.

Figure 6:
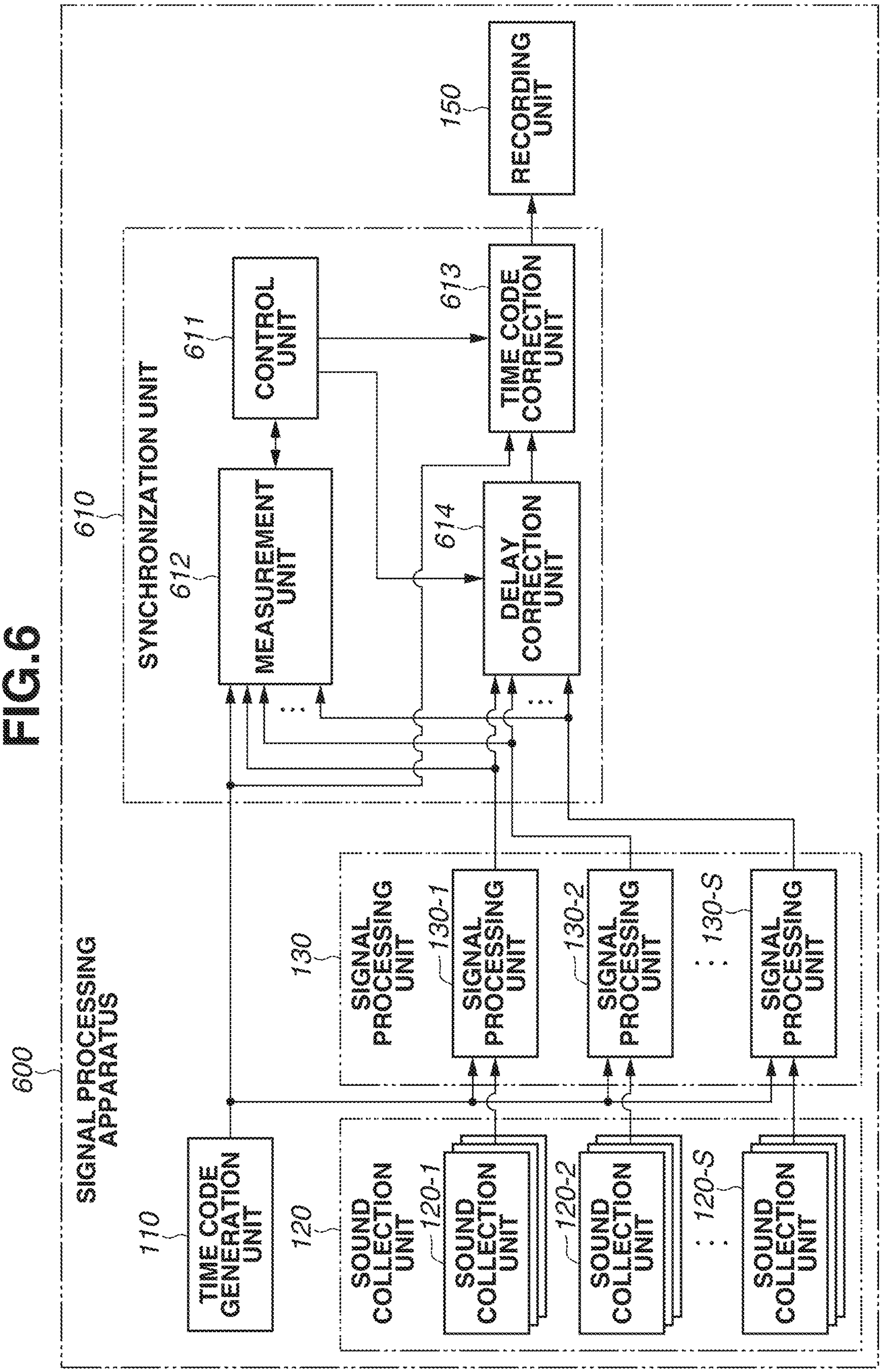
FIG. 6 is a block diagram illustrating a functional configuration of a signal processing apparatus according to a second exemplary embodiment.

FIG. 6 is a block diagram illustrating a functional configuration of a signal processing apparatus 600 according to the second exemplary embodiment. Components illustrated in FIG. 6 having the same functions as the components illustrated in FIG. 1 are assigned the same symbols. For conciseness, descriptions of which are incorporated herein by reference. The signal processing apparatus 600 includes the time code generation unit 110, the sound collection unit 120, the signal processing unit 130, a synchronization unit 610, and the recording unit 150. Further, the synchronization unit 610 includes a control unit 611, a measurement unit 612, a time code correction unit 613, and a delay correction unit 614.

In the signal processing apparatus 600, the sound collection unit 120 includes S number of sound collection units 120-1 to 120-S. An arbitrary sound collection unit may be referred to herein as a sound collection unit 120-*i*. Further, the signal processing unit 130 includes S number of signal processing units 130-1 to 130-S that respectively correspond to the sound collection units 120-1 to 120-S. An arbitrary signal processing unit may be referred to herein as a signal processing unit 130-*i*.

The sound collection unit 120-*i* collects sound (sound and voice) generated from a sound collection target (object) using respective microphones, and outputs to the signal processing unit 130-*i* an acoustic signal acquired by collecting the sound. The signal processing unit 130-*i* receives data/signal from the time code generation unit 110 and/or the corresponding sound collection unit 120-*i*, and performs signal processing on the received acoustic signal. In the present exemplary embodiment, the time code from the time code generation unit 110 is input to the signal processing unit 130-*i* in the measuring mode, and the acoustic signal is input from the sound collection unit 120-*i* in the recording mode. Note that, in the measuring mode, the acoustic signal may be additionally input to the signal processing unit 130-*i*. The signal processing unit 130-*i* outputs the input time code (measuring target time code) or the signal-processed acoustic signal to the measurement unit 612 and the time code correction unit 613. In addition, in the present exemplary embodiment, the processing that can be performed by the signal processing unit 130-*i* on the time code and the acoustic signal is similar to the processing that can be performed by the signal processing unit 130 thereon in the first exemplary embodiment. The synchronization unit 610 corrects the delay between the acoustic signals output from the signal processing units 130-*i*, and the shift between the acoustic signals and the time code from the time code generation unit 110, to synchronize the time code and the acoustic signals. As described above, the synchronization unit 610 includes the control unit 611, the measurement unit 612, the time code correction unit 613, and the delay correction unit 614.

The control unit 611 outputs control information or the like based on an input by a user's operation, to control the operation of the signal processing apparatus 600. For example, the control unit 611 controls whether to perform processing (operation in measuring mode) of measuring a delay amount caused by the signal processing performed by the signal processing unit 130-*i*, or to perform processing (operation in recording mode) of synchronizing the time information based on the time code and the acoustic signal. Further, the control unit 611 measures, for example, the delay amount caused by the signal processing performed by the signal processing unit 130-*i*, and outputs to the measurement unit 612 a delay measuring request for causing the measurement unit 612 to calculate the delay correction value and the time code correction value. Further, the control unit 611 sets the time code correction value acquired from the measurement unit 612 to the time code correction unit 613, and outputs the delay correction value acquired from the measurement unit 612 to the delay correction unit 614. In the present exemplary embodiment, the time code correction value is a value for correcting the delay difference between the acoustic signals output from the signal processing units 130-*i*.

The measurement unit 612 measures a delay amount caused by the signal processing performed by the signal processing unit 130-*i* based on the delay measuring request from the control unit 611, and calculates a delay correction value and a time code correction value based on the measurement result. The delay correction value and the time code correction value calculated by the measurement unit 612 are output to the control unit 611.

Figure 7A:
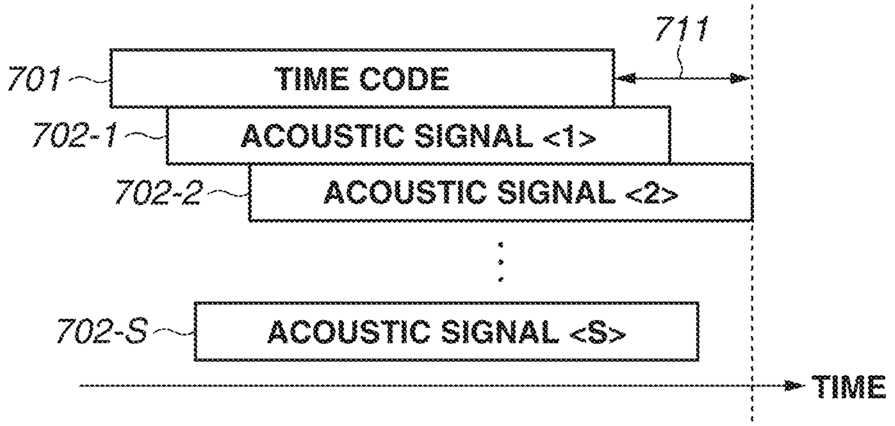
FIGS. 7A to 7C are diagrams illustrating correction of a delay amount of acoustic signals and a time code.
Figure 7B:
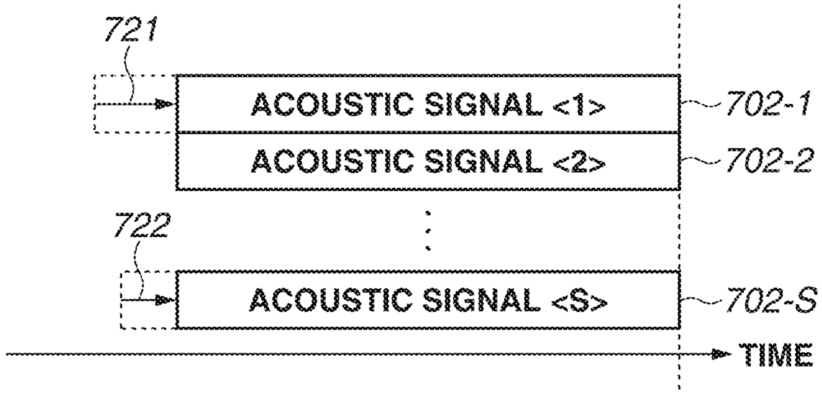
Figure 7C:
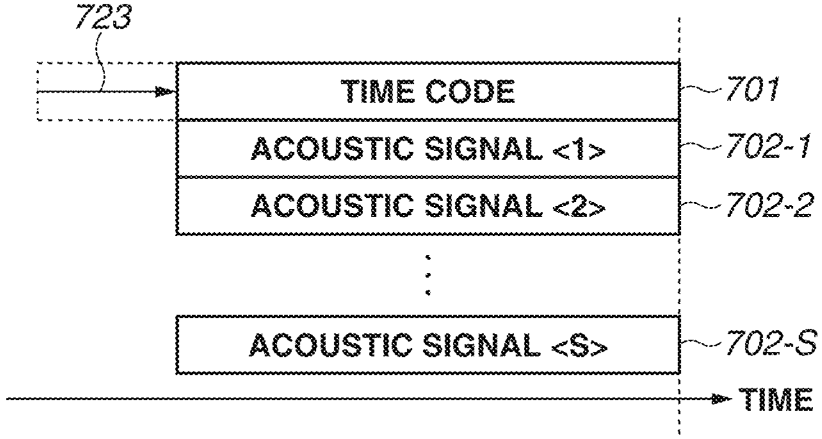

The time code correction unit 613 synchronizes the time code and the acoustic signal based on the time code acquired from the time code generation unit 110, the acoustic signal of which the delay difference between the acoustic signals is corrected by the delay correction unit 614, and the time code correction value acquired from the control unit 611. The time code correction unit 143 clips the acoustic signal according to the time code. The acoustic signal, for example, is clipped at each frame of the time code of the acoustic data. Then, the time code correction unit 613 outputs to the recording unit 150 the synchronized time code as time information and the clipped acoustic signal as acoustic data as illustrated in FIGS. 7A to 7C.

The delay correction unit 614 receives the acoustic signals from the signal processing units 130-*i* and the delay correction values from the control unit 611, corrects the delay amount for each acoustic signal, and outputs to the time code correction unit 613 the acoustic signal of which the delay difference between the acoustic signals is corrected.

In addition, in the example illustrated in FIG. 6, the signal processing apparatus 600 is configured to include the time code generation unit 110, but the configuration is not limited thereto. For example, the signal processing apparatus 600 may be connected to an external time code generation apparatus via a cable or the like, to acquire the time code from the time code generation apparatus.

In the example illustrated in FIG. 6, the signal processing apparatus 600 is configured to include the sound collection unit 120, but the configuration is not limited thereto. For example, the signal processing apparatus 600 may be connected to an external sound collection device such as a microphone via a cable or the like, to acquire an acoustic signal from the sound collection device.

In addition, the hardware configuration of the signal processing apparatus 600 in the second exemplary embodiment is similar to that of the signal processing apparatus 100 in the first exemplary embodiment illustrated in FIG. 3.

In the measuring mode, the signal processing apparatus 600 in the present exemplary embodiment calculates the delay correction value for correcting each of the delay amounts between the plurality of the acoustic signals in addition to the time code correction value. Further, in the recording mode, the signal processing apparatus 600 corrects the delay amounts each between the acoustic signals based on the delay correction value, corrects the time code based on the time code correction value, and synchronizes and records the time information and the acoustic data.

More specifically, in the measuring mode, the signal processing apparatus 600 calculates a delay amount, which is a delay amount of the signal processing unit 130-*i*, and a maximum delay amount, which is the largest delay amount among the delay amounts. Next, the signal processing apparatus 600 calculates a delay correction value for correcting a delay amount of an acoustic signal acquired from the signal processing unit 130-*i* and the time code correction value based on the delay amount and the delay amount max.

In the recording mode, the signal processing apparatus 600 corrects the time shift between the acoustic signals by correcting the delay amount of the acoustic signal by the delay correction unit 614 based on the delay correction value. Further, the signal processing apparatus 600 corrects the shift of the time code by the time code correction unit 613 based on the time code correction value, and synchronizes and records the time information and the acoustic data.

FIGS. 7A to 7C are diagrams illustrating correction of a delay amount of each acoustic signal relative to a time code. FIG. 7A illustrates a state where acoustic signals 702-1 to 702-S that are respectively output from the signal processing units 130-1 to 130-S are delayed by different delay amounts relative to a time code 701.

In FIG. 7A, a delay amount 711 indicates a maximum delay amount of an acoustic signal, i.e., a largest delay amount of acoustic signal <2> 702-2 relative to the time code 701. FIG. 7B illustrates a delay amount correction of each acoustic signal by a corresponding delay correction value calculated by the measurement unit 612. In the example illustrated in FIG. 7B, each of the delay differences between the acoustic signals is corrected to have a same delay amount based on a corresponding delay correction value by delaying the acoustic signal <1> 702-1 by a delay amount 721, and delaying the acoustic signal <S> 702-S by a delay amount 722. FIG. 7C illustrates a correction of the time code relative to the acoustic signals of which delay differences between the acoustic signals are corrected. The time code 701 and the acoustic signals 702-1 to 702-S are synchronized by offsetting the time code 701 based on the time code correction value by a correction amount 723 corresponding to the maximum delay amount 711 illustrated in FIG. 7A.

Figure 8:
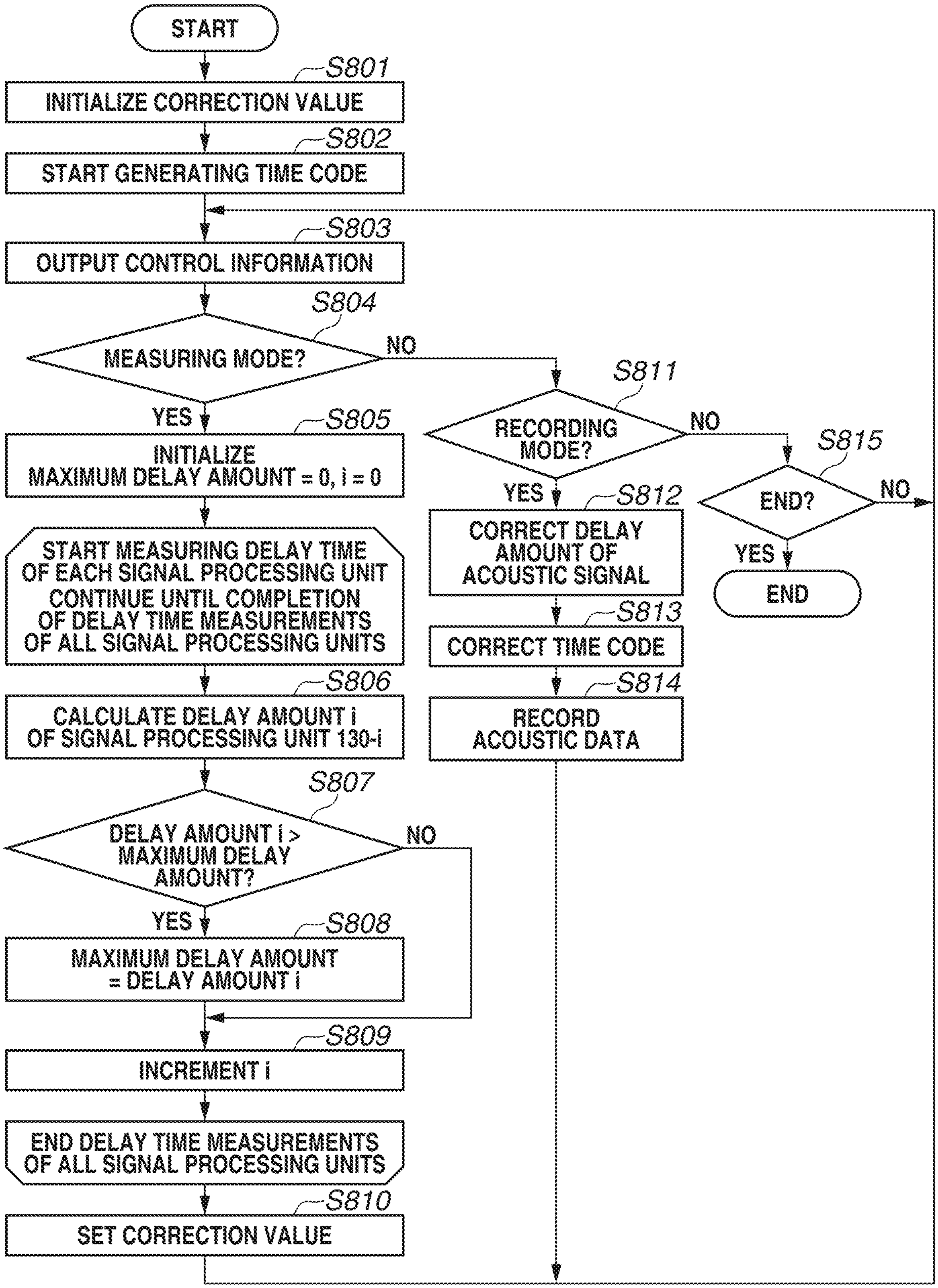
FIG. 8 is a flowchart illustrating an example of processing performed by the signal processing apparatus according to the second exemplary embodiment.

FIG. 8 is a flowchart illustrating an example of processing performed by the signal processing apparatus 600 according to the second exemplary embodiment. The processing illustrated in FIG. 8 starts at a timing, for example, at which the signal processing apparatus 600 receives an instruction to start processing of recording the acoustic data. The instruction to start the processing may be performed by a user's operation via the operation unit 307 or the like of the signal processing apparatus 600, or may be input from an external apparatus. The timing at which the processing illustrated in FIG. 8 starts is not limited to the above-described timing. The processing illustrated in FIG. 8 is implemented by the CPU 301 loading a program stored in the ROM 302 or the like into the RAM 303, and executing the loaded program. At least a part of the processing illustrated in FIG. 8 may be performed by one or more dedicated hardware configurations different from the CPU 301.

In step S801, the time code correction unit 613 initializes a time code correction value.

In step S802, the time code generation unit 110 starts generating a time code, and outputs the generated time code to the signal processing unit 130 (signal processing unit 130-*i*), the measurement unit 612, and the time code correction unit 613.

In step S803, the control unit 611 receives a user's operation or the like via the operation unit 307, and outputs control information to the measurement unit 612, the time code correction unit 613, and the delay correction unit 614.

In step S804, the measurement unit 612 receives the control information from the control unit 611, and determines whether the control information is information indicating the measuring mode. In a case where the measurement unit 612 determines that the control information is information indicating the measuring mode (YES in step S804), the processing proceeds to step S805. On the other hand, in a case where the measurement unit 612 determines that the control information is not information indicating the measuring mode (NO in step S804), the processing proceeds to step S811.

In step S805, the measurement unit 612 initializes to 0 the maximum delay amount and a value of a parameter indicating the signal processing unit 130-*i* for the measurement target.

After performing the processing in step S805, the measurement unit 612 starts measuring the delay amount of the signal processing unit 130-*i*, and the processing in steps S806 to S809 is performed for each of the signal processing units 130-*i*.

In step S806, the measurement unit 612 receives the time code from the time code generation unit 110 and the time code (measuring target time code) from the signal processing unit 130-*i*, and calculates the delay amount of the signal processing unit 130-*i*. The measurement unit 612 calculates a difference between the time code from the time code generation unit 110 and the time code (measuring target time code), and holds the calculated difference value as the delay amount of the acoustic signal caused by the signal processing performed by the signal processing unit 130-*i*.

In step S807, the measurement unit 612 compares the delay amount calculated in step S806, and the maximum delay amount to determine whether the delay amount is larger than the maximum delay amount. In a case where the measurement unit 612 determines that the delay amount calculated in step S806 is larger than the maximum delay amount (YES in step S807), the processing proceeds to step S808. On the other hand, the measurement unit 612 determines that the delay amount calculated in step S806 is equal to the maximum delay amount or less than the maximum delay amount (NO in step S807), the processing proceeds to step S809.

In step S808, the measurement unit 612 overwrites the maximum delay amount with the delay amount.

In step S809, the measurement unit 612 increments the count value of the parameter delay amount by one.

Thus, the measurement unit 612 repeats the processing in steps S806 to S809 by the number of the signal processing units 130, i.e., S times. In this way, the maximum delay amount and the delay amounts 1 to S respectively corresponding to the signal processing units 130-1 to 130-S are obtained. After executing the processing in steps S806 to S809 on all the signal processing units 130-*i*, and completing all the measurements of the delay amounts of the signal processing units 130-*i*, the processing in in step S810 is executed.

In step S810, the measurement unit 612 calculates the delay correction value for correcting the delay amount of each of the acoustic signals, and the time code correction value, and outputs them to the control unit 611. The measurement unit 612 calculates the delay correction value for each of the acoustic signals so that the delay amounts of the acoustic signals match each other.

That is, the measurement unit 612 determines, as a delay correction value, a value obtained by subtracting the delay amount from the maximum delay amount max obtained as described above. Further, the measurement unit 612 determines the maximum delay amount obtained as described above as the time code correction value. Then, the control unit 611 receives inputs of the delay correction value calculated by the measurement unit 612 and the time code correction value, and outputs the received delay correction value to the delay correction unit 614 to set the time code correction value to the time code correction unit 613. After performing the processing in step S810, the processing returns to step S803.

In step S811, the measurement unit 612 receives the control information from the control unit 611, and determines whether the control information is information indicating the recording mode. In a case where the measurement unit 612 determines that the control information is the information indicating the recording mode (YES in step S811), the processing proceeds to step S812. On the other hand, in a case where the measurement unit 612 determines that the control information is not the information indicating the recording mode (NO in step S811), the processing proceeds to step S815.

In step S812, the delay correction unit 614 delays the acoustic signal from the signal processing unit 130-*i* based on the delay correction value received from the control unit 611, and outputs the delayed acoustic signal to the time code correction unit 613.

In step S813, the time code correction unit 613 receives the time code from the time code generation unit 110 and the acoustic signal from the delay correction unit 614, and corrects the time code based on the time code correction value. Further, the time code correction unit 613 clips the acoustic signal by setting the corrected time code as the time information and based on the time information, and outputs the clipped acoustic signal as the acoustic data together with the time information to the recording unit 150.

In step S814, the recording unit 150 receives the time information and the acoustic data from the time code correction unit 613, and records the time information and the acoustic data. After performing the processing in step S814, the processing returns to step S803.

In step S815, the measurement unit 612 receives control information from the control unit 611, and determines whether the control information is an end instruction. In a case where the measurement unit 612 determines that the control information is an end instruction (YES in step S815), the processing illustrated in FIG. 8 ends. On the other hand, in a case where the measurement unit 612 determines that the control information is not an end instruction (NO in step S815), the processing returns to step S803.

According to the present exemplary embodiment, the signal processing allows for correction of the shift between the time code and the delays of the acoustic signals to synchronize the time information and the acoustic signals, even for a plurality of the acoustic signals having different delay amounts.

The present disclosure can be realized by processing of supplying a program for implementing one or more functions of the above-described exemplary embodiments to a system or an apparatus via a network or a storage medium, and one or more processors of a computer in the system or the apparatus reading and executing the program. Further, the present disclosure can also be realized by a circuit (e.g., an ASIC) that can implement one or more functions.

In addition, all the above-described exemplary embodiments are merely examples of the present disclosure and shall not be construed as limiting the technical range of the present disclosure. Thus, the present disclosure can be realized in diverse ways in accordance with the technological thought and/or features thereof.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a CPU, micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a RAM, a ROM, a storage of distributed computing systems, an optical disk (such as a compact disc (CD), digital versatile disc (DVD), or Blu-ray™ Disc), a flash memory device, a memory card, and similar components.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-004047, filed Jan. 15, 2024, which is hereby incorporated by reference herein in its entirety.

What is claimed is:

1. A signal processing apparatus comprising:
 one or more memories configured to store instructions; and
 one or more processors configured to execute the instructions to:
  acquire first time information;
  perform signal processing on an acoustic signal to generate first acoustic data including the acquired first time information;
  measure processing time for the signal processing based on the acquired first time information and the first acoustic data;
  acquire second time information indicating a time after measuring the processing time;
  perform signal processing on the acoustic signal to generate second acoustic data that does not include the first time information and the acquired second time information;
  correct the second time information based on the processing time; and
  record the second acoustic data synchronized in time with the corrected second time information.

2. The signal processing apparatus according to claim 1, wherein generating the first acoustic data includes clipping the acoustic signal in a predetermined unit corresponding to the first time information.

3. The signal processing apparatus according to claim 1, wherein the first acoustic data includes the first time information in a data area corresponding to a predetermined channel of the acoustic signal.

4. The signal processing apparatus according to claim 1, wherein the one or more processors are further configured to execute the instructions for switching to perform processing to measure the processing time, or to synchronize the corrected second time information with the second acoustic data.

5. The signal processing apparatus according to claim 1, wherein the processing time is measured based on a time at which the first acoustic data is generated, and the first time information.

6. The signal processing apparatus according to claim 1,
 wherein the acoustic signal includes a plurality of acoustic signals collected by a plurality of sound collection units, and
 wherein the one or more processors are further configured to execute the instructions to measure the processing time for each of the plurality of acoustic signals on which the signal processing is performed, and record each of the acoustic data generated from the plurality of the acoustic signals synchronized in time with the corrected second time information.

7. The signal processing apparatus according to claim 6, further comprising generating a time code,
 wherein the one or more processors are further configured to execute the instructions to perform synchronization of the signal processed acoustic signal based on a maximum time among the processing times measured for each of the plurality of acoustic signals relative to the time code.

8. A control method for a signal processing apparatus, the control method comprising:
 acquiring first time information;
 performing signal processing on an acoustic signal to generate first acoustic data including the acquired first time information;
 measuring processing time for the signal processing based on the acquired first time information and the first acoustic data;
 acquiring second time information indicating a time after measuring the processing time;
 performing signal processing on the acoustic signal to generate second acoustic data that does not include the first time information and the acquired second time information;
 correcting the second time information based on the processing time; and
 recording the second acoustic data synchronized in time with the corrected second time information.

9. A non-transitory computer-readable recording medium storing a program for causing a signal processing apparatus to execute a control method, the control method comprising:
 acquiring first time information;
 performing signal processing on an acoustic signal to generate first acoustic data including the acquired first time information;
 measuring processing time for the signal processing based on the acquired first time information and the first acoustic data;
 acquiring second time information indicating a time after measuring the processing time;
 performing signal processing on the acoustic signal to generate second acoustic data that does not include the first time information and the acquired second time information;
 correcting the second time information based on the processing time; and
 recording the second acoustic data synchronized in time with the corrected second time information.

10. A control method for a signal processing system, the control method comprising:
 acquiring first time information;
 performing signal processing on an acoustic signal to generate first acoustic data including the acquired first time information;
 measuring processing time for the signal processing based on the acquired first time information and the first acoustic data;
 acquiring second time information indicating a time after measuring the processing time;
 performing signal processing on the acoustic signal to generate second acoustic data that does not include the first time information and the acquired second time information;
 correcting the second time information based on the processing time; and
 recording the second acoustic data synchronized in time with the corrected second time information.

11. A signal processor comprising:
 a memory configured to store instructions; and
 a processor configured to execute the instructions to:
  receive first time identification information;
  process an acoustic signal to generate first acoustic data that includes the received first time identification information;
  measure a time duration for the processing of the acoustic signal;

receive second time identification information indicating a time after the measured time duration of the processing of the acoustic signal;

correct the second time identification information based on the time duration;

re-process the acoustic signal to generate second acoustic data; and record the second acoustic data with the corrected second time identification information.

12. The signal processor of claim 11, wherein, based on the measured time duration and the corrected second time identification information, the first acoustic data is synchronized with the second acoustic data.

13. The signal processor of claim 11, wherein the second acoustic data does not include the first time identification information or the second time identification information.

14. The signal processor of claim 11, wherein the first time identification information is based on measurements of an environment in which the first acoustic data and the second acoustic data are to be output.

* * * * *